United States Patent
Yang

(10) Patent No.: US 10,915,812 B2
(45) Date of Patent: Feb. 9, 2021

(54) METHOD AND SYSTEM OF MANAGING COMPUTING PATHS IN AN ARTIFICIAL NEURAL NETWORK

(71) Applicant: SAMSUNG ELECTRONICS CO., LTD., Suwon-si (KR)

(72) Inventor: Seung-Soo Yang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 846 days.

(21) Appl. No.: 15/662,956

(22) Filed: Jul. 28, 2017

(65) Prior Publication Data
US 2018/0129939 A1    May 10, 2018

(30) Foreign Application Priority Data
Nov. 9, 2016   (KR) .................. 10-2016-0148995

(51) Int. Cl.
*G06N 3/08*    (2006.01)
*G06N 3/063*   (2006.01)
*G06N 3/04*    (2006.01)

(52) U.S. Cl.
CPC .............. *G06N 3/08* (2013.01); *G06N 3/04* (2013.01); *G06N 3/063* (2013.01)

(58) Field of Classification Search
CPC ............ G06N 3/08; G06N 3/04; G06N 3/063
(Continued)

(56) References Cited

U.S. PATENT DOCUMENTS 5,351,311 A   9/1994  Rogers et al.
5,355,434 A   10/1994 Yoneda et al.
(Continued)

FOREIGN PATENT DOCUMENTS

CN    102521981    6/2012
CN    102594927    7/2012
(Continued)

OTHER PUBLICATIONS

Shinozaki Takashi, "Learning System and Learning Method of Hierarchical Neural Network", JP2015210747 (A)—Nov. 24, 2015. (Year: 2015).*

*Primary Examiner* — Dave Misir
(74) *Attorney, Agent, or Firm* — F. Chau & Associates, LLC

(57) ABSTRACT

In a method of managing a plurality of computing paths in an artificial neural network (ANN) driven by a plurality of heterogeneous resources, resource information, preference level metrics, and a plurality of initial computing paths are obtained by performing an initialization. The resource information represents information associated with the heterogeneous resources. The preference level metrics represent a relationship between the heterogeneous resources and a plurality of operations. The initial computing paths represent computing paths predetermined for the operations. When a first event including at least one of the plurality of operations is to be performed, a first computing path for the first event is set based on the initial computing paths, the preference level metrics, resource environment, and operating environment. The resource environment represents whether the heterogeneous resources are available. The operating environment represents contexts of the ANN and at least one electronic device including the heterogeneous resources.

20 Claims, 20 Drawing Sheets

(58) Field of Classification Search
 USPC .......................................................... 706/25
 See application file for complete search history.

(56) References Cited

U.S. PATENT DOCUMENTS

| | | | |
|---|---|---|---|
| 5,745,652 A | 4/1998 | Bigus | |
| 7,218,755 B2 | 5/2007 | Smaragdis et al. | |
| 8,442,667 B2 | 5/2013 | Pannese | |
| 8,885,609 B2 | 11/2014 | Nix | |
| 2004/0003132 A1 | 1/2004 | Stanley et al. | |
| 2008/0208372 A1 | 8/2008 | Pannese | |
| 2009/0182693 A1 | 7/2009 | Fulton et al. | |
| 2013/0151448 A1 | 6/2013 | Ponulak | |
| 2014/0189702 A1* | 7/2014 | Yan | G06F 9/5027 718/104 |
| 2014/0189703 A1* | 7/2014 | Gilder | G06F 9/5027 718/104 |
| 2014/0257804 A1 | 9/2014 | Li et al. | |
| 2014/0310072 A1 | 10/2014 | Wojciechowski | |
| 2014/0331235 A1* | 11/2014 | Lee | G06F 9/5027 718/104 |
| 2015/0302294 A1 | 10/2015 | Modha | |
| 2016/0035078 A1 | 2/2016 | Lin et al. | |
| 2016/0154676 A1 | 6/2016 | Wen et al. | |
| 2016/0380908 A1* | 12/2016 | Larsson | H04L 67/10 709/226 |
| 2017/0286861 A1* | 10/2017 | Kelly | G06N 3/08 |
| 2018/0048532 A1* | 2/2018 | Poort | G06F 9/5066 |

FOREIGN PATENT DOCUMENTS

| | | |
|---|---|---|
| EP | 0528399 | 2/1993 |
| EP | 1025478 | 8/2000 |
| JP | 09-091263 | 4/1997 |
| JP | 2007-233760 | 9/2007 |
| JP | 2015-210747 | 11/2015 |
| KR | 10-0445264 | 8/2004 |

\* cited by examiner

FIG. 4

| OP_ID | CLS_ID | LV_ID | RCS_ID | ALG_ID | IMP_ID |
|---|---|---|---|---|---|
| Conv_3x3 | Bst | 1 | VPU | FFT_8x8 | ver2.0 |
| | | 2 | NPU | Winograd | perf |
| | | 3 | GPU | FFT_16x16 | cl3.0 |
| | Perf | 1 | R_GPU | ultraFast | opt1.0 |
| Relu | Pwr | 1 | DSP | perf_opt | 8bit |
| | | 2 | CPU | pwr_opt | ver3.5 |
| | Lcl | 1 | GPU | Comprs | cl0pt |
| Memcopy | Perf | 1 | SDMA | perf_opt | lossy |
| | | 2 | MDMA | pwr_opt | lossless |
| | Rmt | 1 | RDMA | lowLatency | P2P |

FIG. 5

| TYP | P_ID | PRIO | OP_ID | CLS_ID | LV_ID | RNG_ID |
|---|---|---|---|---|---|---|
| Preem | Priv_spch | 3 | Conv_3x3 | Perf | 1 | Rmt |
| | | | Pool_max | Perf | 1 | Rmt |
| | ADAS | 1 | FC | Perf | 2 | Rmt |
| Tbst | Img_cls | 3 | Pool_mean | Bst | 1 | Rmt |
| | | | Relu | Perf | - | - |
| | Pub_spch | 2 | Conv_5x5 | Pwr | - | - |
| | Pub_spch | - | Softmax | Bst | - | - |
| Lmt | Auth | - | - | - | - | Compan |
| | | | | | | Lcl |

FIG. 12B

METHOD AND SYSTEM OF MANAGING COMPUTING PATHS IN AN ARTIFICIAL NEURAL NETWORK

CROSS-REFERENCE TO RELATED APPLICATION

This application claims priority under 35 U.S.C. § 119 to Korean Patent Application No. 10-2016-0148995, filed on Nov. 9, 2016 in the Korean Intellectual Property Office (KIPO), the disclosure of which is incorporated by reference herein in its entirety.

TECHNICAL FIELD

Exemplary embodiments of the inventive concept relate generally to artificial neural networks, and more particularly, to methods of managing a plurality of computing paths in artificial neural networks and systems for performing these methods.

DISCUSSION OF RELATED ART

An artificial neural network (ANN) is obtained by engineering a cell structure model of a human brain where a process of efficiently recognizing a pattern is performed. The ANN refers to a calculation model that is based on software or hardware and is designed to imitate biological calculation abilities by applying many artificial neurons interconnected through connection lines. The human brain consists of neurons that are basic units of a nerve, and encrypts or decrypts information according to different types of dense connections between these neurons. Artificial neurons in the ANN are obtained through simplification of biological neuron functionality. The ANN performs a cognition or learning process by interconnecting the artificial neurons having connection intensities. Accordingly, deep learning processes and services may be performed based on the ANN.

SUMMARY

According to an exemplary embodiment of the inventive concept, in a method of managing a plurality of computing paths in an artificial neural network (ANN) configured to be driven by a plurality of heterogeneous resources, resource information, preference level metrics, and a plurality of initial computing paths are obtained by performing an initialization. The resource information represents information associated with the plurality of heterogeneous resources. The preference level metrics represent a relationship between the plurality of heterogeneous resources and a plurality of operations. The plurality of initial computing paths represent computing paths predetermined for the plurality of operations. When a first event including at least one of the plurality of operations is to be performed, a first computing path for the first event is set based on the plurality of initial computing paths, the preference level metrics, resource environment, and operating environment. The resource environment represents whether the plurality of heterogeneous resources is available. The operating environment represents contexts of the ANN and at least one electronic device including the plurality of heterogeneous resources.

According to an exemplary embodiment of the inventive concept, a system of managing a plurality of computing paths in an artificial neural network (ANN) includes a plurality of heterogeneous resources and at least one adaptive path manager. The plurality of heterogeneous resources is configured to drive the ANN. The at least one adaptive path manager is configured to manage the plurality of computing paths in the ANN. The at least one adaptive path manager obtains resource information, preference level metrics, and a plurality of initial computing paths by performing an initialization. The resource information represents information associated with the plurality of heterogeneous resources. The preference level metrics represent a relationship between the plurality of heterogeneous resources and a plurality of operations. The plurality of initial computing paths represent computing paths predetermined for the plurality of operations. When a first event including at least one of the plurality of operations is to be performed, the at least one adaptive path manager sets a first computing path for the first event based on the plurality of initial computing paths, the preference level metrics, resource environment, and operating environment. The resource environment represents whether the plurality of heterogeneous resources is available. The operating environment represents contexts of the ANN and at least one electronic device including the plurality of heterogeneous resources.

According to an exemplary embodiment of the inventive concept, in a method of managing a plurality of computing paths in an artificial neural network (ANN) configured to be driven by a plurality of heterogeneous resources, resource information, preference level metrics, and a plurality of initial computing paths are obtained by performing an initialization. The resource information represents information associated with the plurality of heterogeneous resources. The preference level metrics represent a relationship between the plurality of heterogeneous resources and a plurality of operations. The plurality of initial computing paths represent computing paths predetermined for the plurality of operations. It is determined that a first trigger signal for a first event is activated and a second trigger signal for a second event is activated. Each of the first and second events include at least one of the plurality of operations to be performed. A first computing path for the first event and a second computing path for the second event are set based on the plurality of initial computing paths, the preference level metrics, resource environment, and operating environment. The resource environment represents whether the plurality of heterogeneous resources is available, and the operating environment represents contexts of the ANN and at least one electronic device including the plurality of heterogeneous resources. One of the first and second computing paths is changed when the first and second computing paths at least partially overlap with each other.

BRIEF DESCRIPTION OF THE DRAWINGS

The above and other features of the inventive concept will be more clearly understood by describing in detail exemplary embodiments thereof with reference to the accompanying drawings.

FIGS. 4 and 5 are tables for describing a method of managing a plurality of computing paths in an ANN according to an exemplary embodiment of the inventive concept.

FIGS. 12A, 12B, 12C, 13A, 13B, and 13C are diagrams for describing a method of managing a plurality of computing paths in an ANN according to exemplary embodiments of the inventive concept.

DETAILED DESCRIPTION OF THE EMBODIMENTS

Figure 1:
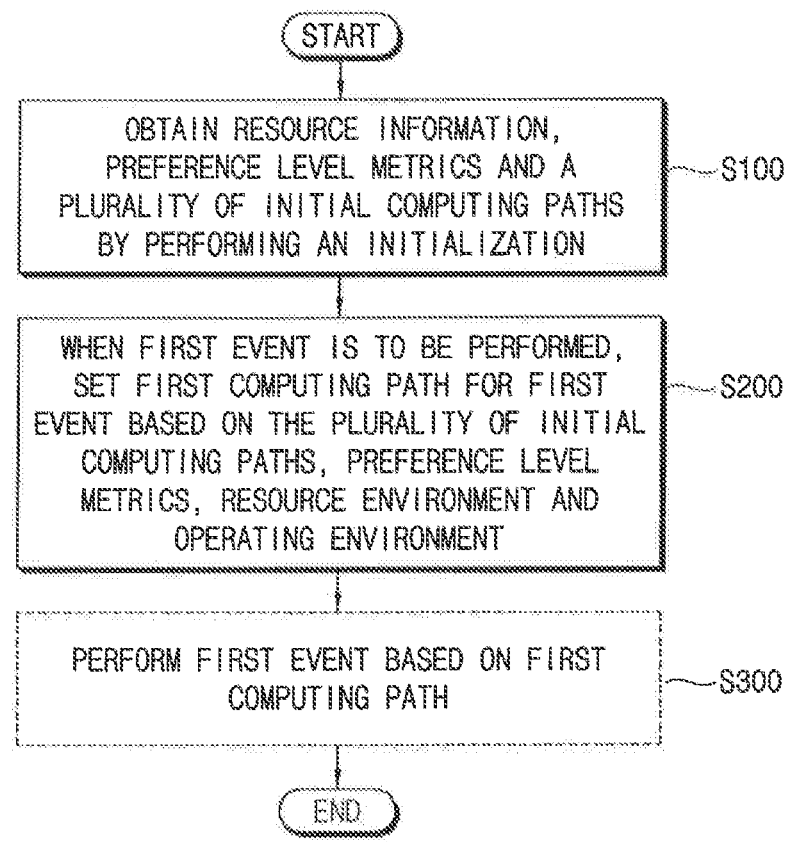
FIG. 1 is a flowchart illustrating a method of managing a plurality of computing paths in an artificial neural network (ANN) according to an exemplary embodiment of the inventive concept.

Exemplary embodiments of the inventive concept will be described more fully hereinafter with reference to the accompanying drawings. Like reference numerals may refer to like elements throughout this application.

Exemplary embodiments of the inventive concept provide a method of dynamically managing (e.g., selecting, controlling, changing, etc.) a plurality of computing paths in an artificial neural network (ANN) of heterogeneous resources.

Exemplary embodiments of the inventive concept also provide a system of dynamically managing the plurality of computing paths in the ANN of the heterogeneous resources.

FIG. 1 is a flowchart illustrating a method of managing a plurality of computing paths in an ANN according to an exemplary embodiment of the inventive concept.

Referring to FIG. 1, in a method of managing a plurality of computing paths in an ANN according to an exemplary embodiment of the inventive concept, the ANN is implemented by or embodied as a plurality of heterogeneous resources. In other words, the ANN is driven, run, or executed by the plurality of heterogeneous resources. In the method according to an exemplary embodiment of the inventive concept, resource information, preference level metrics, and a plurality of initial computing paths are obtained by performing an initialization (operation S100).

The resource information represents information associated with the plurality of heterogeneous resources. For example, the resource information may include types of the resources, the number of the resources, performance/power information of each resource, data movement cost of each resource, arithmetic algorithms supported by each resource, limitations of each resource, etc. The preference level metrics represent a relationship (e.g., preference, priority, superiority, etc.) between the plurality of heterogeneous resources and a plurality of operations (e.g., arithmetic operations or computing operations). The plurality of initial computing paths represents computing paths that are predetermined for the plurality of operations for an initial time. The preference level metrics and the plurality of initial computing paths may be implemented as tables, and will be described below with reference to FIGS. 4 and 5, respectively.

When a first event is to be performed, a first computing path for the first event is set based on the plurality of initial computing paths, the preference level metrics, resource environment, and operating environment (operation S200). The first event may be performed based on the first computing path (operation S300).

The first event includes at least one of the plurality of operations. For example, the first event may represent an application or a service, e.g., a deep learning service, a user authentication service based on bio-information or biometric data, or the like. The resource environment represents whether the plurality of heterogeneous resources is available or not. The operating environment represents contexts (e.g., current states or conditions) of the ANN and at least one electronic device including the plurality of heterogeneous resources. Detailed processes of setting, controlling, or changing a plurality of computing paths based on the resource environment and the operating environment will be described below with reference to FIGS. 8A, 8B, 8C, 12A, 12B, 12C, 13A, 13B, and 13C.

According to exemplary embodiments of the inventive concept, operation S300 in FIG. 1 may be omitted. In other words, the method of managing the plurality of computing paths in the ANN may include only operations S100 and S200.

According to exemplary embodiments of the inventive concept, operations S100, S200, and S300 together may be referred to as a method of processing or performing a plurality of operations in an ANN.

As used herein, the term "computing path" or "path" represents a combination of resources, which are used for performing a single event or operation over a period of time. For example, at least one resource may be used for performing the single event or operation. Alternatively, to perform the single event or operation, a first resource may be used during a first time interval, and a second resource may be used during a second time interval after the first time interval. The term "computing path" or "path" may further include information used in each resource for performing the single event or operation, such as arithmetic algorithms, implementations, communication schemes, etc.

In the method of managing the plurality of computing paths in the ANN according to an exemplary embodiment of the inventive concept, the first computing path may be set based on the plurality of initial computing paths, the preference level metrics, the resource environment, and the operating environment, and the first event may be performed based on the first computing path. In other words, at least one event or operation may be performed using an optimized computing path that is dynamically and adaptively set based on resources and context (e.g., the computing path is resource-aware and context-aware). Accordingly, the ANN may have relatively increased performance and energy efficiency.

Figure 2:
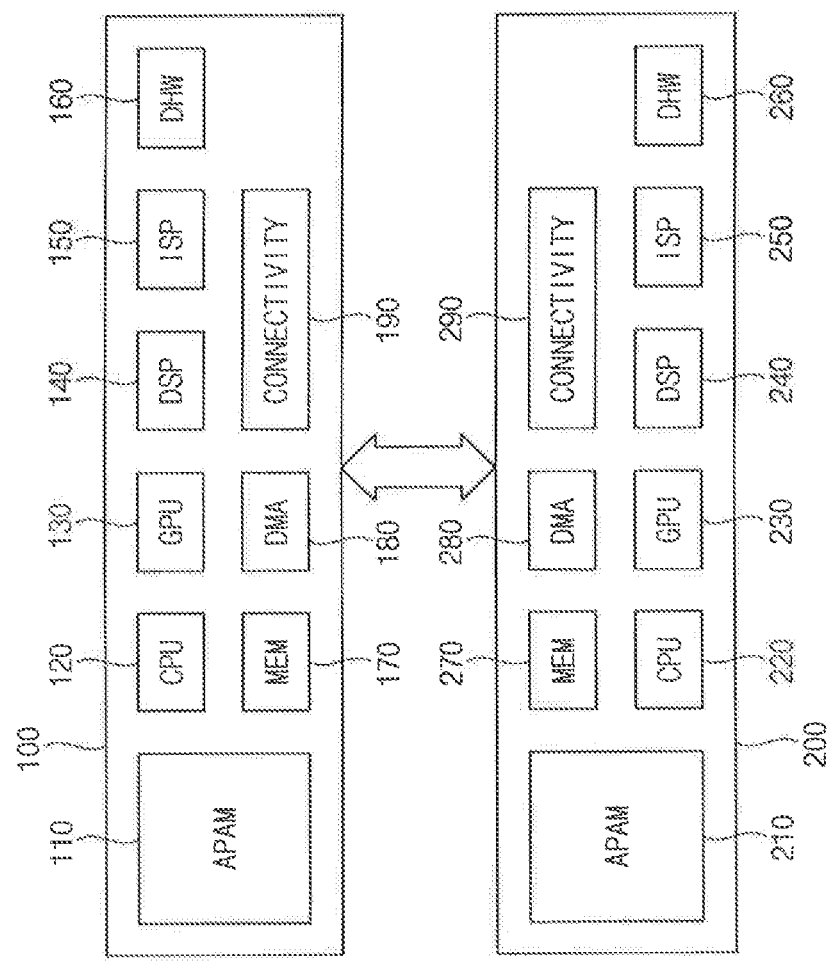
FIG. 2 is a block diagram illustrating a system of managing a plurality of computing paths in an ANN according to an exemplary embodiment of the inventive concept.

FIG. 2 is a block diagram illustrating a system of managing a plurality of computing paths in an ANN according to an exemplary embodiment of the inventive concept.

Referring to FIG. 2, a system of managing a plurality of computing paths in an ANN according to an exemplary embodiment of the inventive concept includes the plurality of heterogeneous resources for driving the ANN and at least one adaptive path manager (APAM) for managing the plurality of computing paths in the ANN. For example, the at least one APAM may include a first APAM 110 and a second APAM 210.

The plurality of heterogeneous resources may include central processing units (CPUs) 120 and 220, graphic processing units (GPUs) 130 and 230, digital signal processors (DSPs) 140 and 240, image signal processors (ISPs) 150 and 250, dedicated hardware (DHWs) 160 and 260, memories (MEMs) 170 and 270, direct memory access units (DMAs) 180 and 280, and connectivities 190 and 290. The CPUs 120 and 220, the GPUs 130 and 230, the DSPs 140 and 240, the ISPs 150 and 250, and the DHWs 160 and 260 may be referred to as computing resources. The DMAs 180 and 280 and the connectivities 190 and 290 may be referred to as communication resources.

Each of the CPUs 120 and 220, the GPUs 130 and 230, the DSPs 140 and 240, the ISPs 150 and 250, and the DHWs 160 and 260 may perform various computational functions such as particular calculations and tasks. For example, each of the DHWs 160 and 260 may include a vision processing unit (VPU), a virtual image processor (VIP), etc. Each of the MEMs 170 and 270 may operate as a working memory or a data storage for data processed by the plurality of heterogeneous resources. The DMAs 180 and 280 may control access to the memories 170 and 270, respectively. For example, each of the DMAs 180 and 280 may include a memory DMA (MDMA), a peripheral DMA (PDMA), a remote DMA (RDMA), a smart DMA (SDMA), etc. Each of the connectivities 190 and 290 may perform wired/wireless communication with an internal element and/or an external device. For example, each of the connectivities 190 and 290 may include an internal bus that supports an internal communication such as a system bus, peripheral component interconnect (PCI), PCI express (PCIe), etc., and/or may support an external communication such as a mobile telecommunication, universal serial bus (USB), Ethernet, WiFi, Bluetooth, near field communication (NFC), radio frequency identification (RFID), etc.

The computing resources may further include a microprocessor, an application processor (AP), a customized hardware, a compression hardware, etc., and the communication resources may further include resources capable of memory copy, etc.

Each of the APAMs 110 and 210 may perform the method of managing the plurality of computing paths in the ANN according to an exemplary embodiment of the inventive concept (e.g., the method described with reference to FIG. 1). For example, the first APAM 110 may set an optimized computing path for performing at least one event and/or operation based on resources and context.

According to exemplary embodiments of the inventive concept, at least a part of the APAMs 110 and 210 may be implemented as hardware. According to exemplary embodiments of the inventive concept, at least a part of the APAMs 110 and 210 may be implemented as instructions or program routines (e.g., a software program) that are executed by a processor and are stored in a storage.

According to exemplary embodiments of the inventive concept, some of the heterogeneous resources (e.g., 120, 130, 140, 150, 160, 170, 180, and 190) and the first APAM 110 may be included in a first electronic device 100, and the other heterogeneous resources (e.g., 220, 230, 240, 250, 260, 270, 280, and 290) and the second APAM 210 may be included in a second electronic device 200. The first electronic device 100 may be an electronic device that directly interacts with a user (e.g., directly controlled by a user). The second electronic device 200 may be physically separated from the first electronic device 100, and may be interoperable with the first electronic device 100.

The first electronic device 100 may be referred to as a local device, and the heterogeneous resources 120, 130, 140, 150, 160, 170, 180, and 190 included in the first electronic device 100 may be referred to as local resources. The second electronic device 200 may be referred to as a remote device, and the heterogeneous resources 220, 230, 240, 250, 260, 270, 280, and 290 included in the second electronic device 200 may be referred to as remote resources. Each of the first and second electronic devices 100 and 200 may be an electronic device with a built-in ANN or built-in artificial intelligence (AI) function (e.g., an electronic device where the ANN or the AI function is embedded).

According to exemplary embodiments of the inventive concept, the first electronic device 100 may be any computing device and/or mobile device, such as a personal computer (PC), a laptop computer, a mobile phone, a smart phone, a tablet computer, a personal digital assistants (PDA), a portable multimedia player (PMP), a digital camera, a camcorder, a music player, a video player, a portable game console, a navigation device, a wearable device, an internet of things (IoT) device, an internet of everythings (IoE) device, a virtual reality (VR) device, an augmented reality (AR) device, etc.

According to exemplary embodiments of the inventive concept, the second electronic device 200 may be any computing device and/or mobile device that is interoperable with the first electronic device 100. For example, the second electronic device 200 may be a companion chip or an off-chip such as a neural processing unit (NPU), a parallel processing element (PE), etc. As another example, the second electronic device 200 may be a companion device that depends on the first electronic device 100, such as a wearable device (e.g., a smart watch). Alternatively, the second electronic device 200 may be an in-house server (e.g., a home gateway) that controls an IoT device and/or an IoE device, or an outside server (e.g., a cloud server).

Although FIG. 2 illustrates a system including a single local device (e.g., the first electronic device 100) and a single remote device (e.g., the second electronic device 200), the system of managing the plurality of computing paths in the ANN according to an exemplary embodiment of the inventive concept may include, for example, a single local device and a plurality of remote devices that are interoperable with the local device.

Figure 3A:
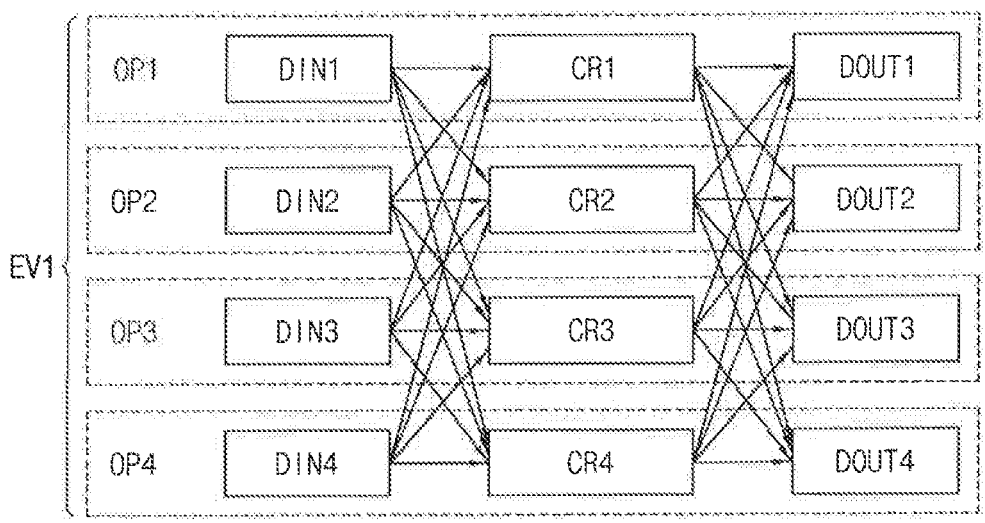
FIGS. 3A and 3B are diagrams for describing an ANN according to an exemplary embodiment of the inventive concept.
Figure 3B:
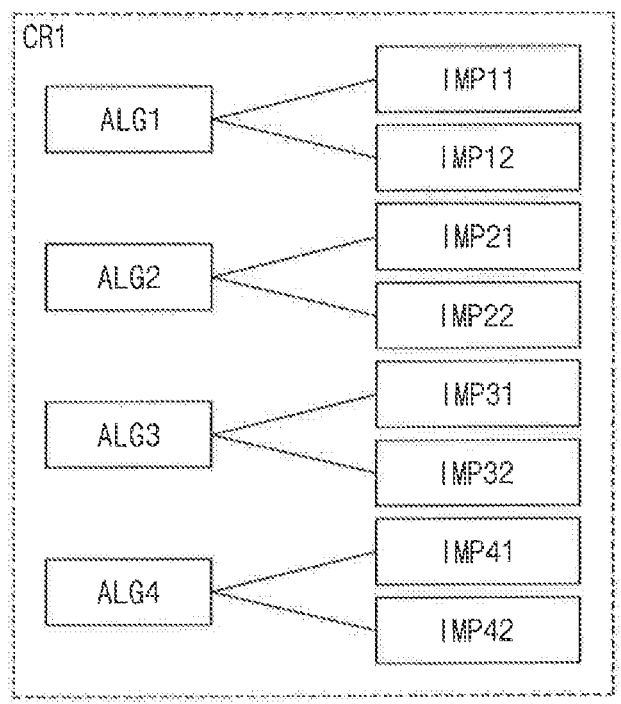

FIGS. 3A and 3B are diagrams for describing an ANN according to an exemplary embodiment of the inventive concept.

Referring to FIGS. 3A and 3B, in an ANN according to an exemplary embodiment of the inventive concept, there may be a plurality of resources, a plurality of arithmetic algorithms, and a plurality of implementations capable of performing a single operation. For example, the number of the resources capable of performing a single operation may be M, where M is a natural number greater than or equal to two. The number of the arithmetic algorithms capable of performing the single operation may be N, where N is a natural number greater than or equal to M. The number of the implementations capable of performing the single operation may be K, where K is a natural number greater than or equal to N.

As illustrated in FIG. 3A, four operations (or arithmetic operations) OP1, OP2, OP3, and OP4 may be performed for a single event EV1. By performing four operations OP1~OP4, input data DIN1, DIN2, DIN3, and DIN4 may be processed, and thus, output data DOUT1, DOUT2, DOUT3, and DOUT4 may be generated. For example, four computing resources CR1, CR2, CR3, and CR4 may be used for performing the four operations OP1~OP4. In other words, in the example of FIG. 3A, the number of computing resources capable of performing the first operation OP1 that generates the first output data DOUT1 based on the first input data DIN1 may be four.

As illustrated in FIG. 3B, the number of arithmetic algorithms capable of being performed in the first computing resource CR1 may be four, and there may be two implementations for each arithmetic algorithm. For example, a first arithmetic algorithm ALG1 may be established based on one of two implementations IMP11 and IMP12. Similarly, a second arithmetic algorithm ALG2 may be established based on one of two implementations IMP21 and IMP22, a third arithmetic algorithm ALG3 may be established based on one of two implementations IMP31 and IMP32, and a fourth arithmetic algorithm ALG4 may be established based on one of two implementations IMP41 and IMP42.

The number of arithmetic algorithms and implementations for each of the second, third, and fourth computing resources CR2, CR3, and CR4 may be substantially the same as or different from those of the first computing resource CR1. In the example of FIGS. 3A and 3B, if it is assumed that the number of arithmetic algorithms and implementations in each computing resource are substantially the same as each other and there are no duplicate arithmetic algorithms and implementations, the number of computing resources capable of performing a single operation (e.g., the operation) may be four, the number of arithmetic algorithms capable of performing the single operation may be sixteen, and the number of implementations capable of performing the single operation may be thirty-two.

FIGS. 4 and 5 are tables for describing a method of managing a plurality of computing paths in an ANN according to an exemplary embodiment of the inventive concept. FIG. 4 is a table illustrating an example of the preference level metrics described above with reference to FIG. 1. FIG. 5 is a table illustrating an example of the plurality of initial computing paths described above with reference to FIG. 1.

Referring to FIG. 4, the preference level metrics that are used in the method of managing the plurality of computing paths in the ANN according to an exemplary embodiment of the inventive concept may represent a relationship between the plurality of heterogeneous resources and the plurality of operations. According to exemplary embodiments of the inventive concept, as illustrated in FIG. 4, the preference level metrics may include an operation identification (ID) OP_ID, a class ID CLS_ID, a level ID LV_ID, a resource ID RCS_ID, an arithmetic algorithm ID ALGID, and an implementation ID IMP_ID for each operation.

The operation ID OP_ID in the preference level metrics may represent a type of each operation. For example, a term "Conv_3×3" in FIG. 4 may represent a convolution operation of a 3*3 matrix. A term "Relu" in FIG. 4 may represent a rectified linear unit operation corresponding to an activation function, such as a function f(x)=max(0, x) (e.g., an output is zero when x is negative). A term "Memcopy" in FIG. 4 may represent a memory copy operation.

The class ID CLS_ID in the preference level metrics may represent modes or coverages for each operation. For example, the class ID CLS_ID in FIG. 4 may include a first class ID "Bst", a second class ID "Pwr", a third class ID "Perf", a fourth class ID "Lcl", and a fifth class ID "Rmt". The first class ID "Bst" may represent a best mode that satisfies or meets all requirements (e.g., power, performance, security, etc.). The second class ID "Pwr" may represent a power-optimized mode. The third class ID "Perf" may represent a performance-optimized mode. The fourth class ID "Lcl" may represent a mode that is only operable in a local device. The fifth class ID "Rmt" may represent a mode that is only operable in a remote device.

The level ID LV_ID in the preference level metrics may represent a level for each operation. For example, the level ID LV_ID in FIG. 4 may be a natural number greater than or equal to one, and a lower number may be superior to or better than a higher number. For example, in the same operation and the same class, a case in which the level ID LV_ID is "2" may be superior to a case in which the level ID LV_ID is "3", and a case in which the level ID LV_ID is "1" may be superior to a case in which the level ID LV_ID is "2".

The resource ID RCS_ID, the arithmetic algorithm ID ALG_ID, and the implementation ID IMP_ID in the preference level metrics may represent a type of a resource, a type of an arithmetic algorithm, and a type of an implementation, respectively, for performing each operation.

For example, as illustrated in FIG. 4, the convolution operation of a 3*3 matrix "Conv_3×3" may be performed by a resource "VPU" (e.g., a vision processing unit in a local device) based on an arithmetic algorithm of "FFT_8×8" and an implementation of "ver2.0", by a resource "NPU" (e.g., a neural processing unit in a local device) based on an arithmetic algorithm of "Winograd" and an implementation of "perf", by a resource "GPU" (e.g., a graphic processing unit in a local device) based on an arithmetic algorithm of "FFT_16×16" and an implementation of "cl3.0", or by a resource "R_GPU" (e.g., a graphic processing unit in a remote device) based on an arithmetic algorithm of "ultra-Fast" and an implementation of "opt1.0".

The rectified linear unit operation "Relu" may be performed by a resource "DSP" (e.g., a digital signal processor in a local device) based on an arithmetic algorithm of "perf_opt" and an implementation of "8 bit", by a resource "CPU" (e.g., a central processing unit in a local device) based on an arithmetic algorithm of "pwr_opt" and an implementation of "ver3.5", or by a resource "GPU" (e.g., a graphic processing unit in a local device) based on an arithmetic algorithm of "Comprs" and an implementation of "cl0pt".

The memory copy operation "Memcopy" may be performed by a resource "SDMA" (e.g., a smart DMA in a local device) based on an arithmetic algorithm of "perf_opt" and an implementation of "lossy", by a resource "MDMA" (e.g., a memory DMA in a local device) based on an arithmetic algorithm of "pwr_opt" and an implementation of "lossless", or by a resource "RDMA" (e.g., a DMA in a remote device) based on an arithmetic algorithm of "lowLatency" and an implementation of "P2P".

Referring to FIG. 5, the plurality of initial computing paths that are used in the method of managing the plurality of computing paths in the ANN according to an exemplary embodiment of the inventive concept may include a first type "Preem" of computing paths, a second type "Tbst" of computing paths, and a third type "Lmt" of computing paths. The first type "Preem" of computing paths may represent computing paths that are determined by preempting or preoccupying at least one of the plurality of heterogeneous resources. The second type "Tbst" of computing paths may represent computing paths that are determined based on the resource environment and priorities of the plurality of heterogeneous resources. The third type "Lmt" of computing paths may represent computing paths that are determined by limiting some of the plurality of heterogeneous resources. A type TYP of each initial computing path may correspond to one of these three types.

In the first type "Preem" of computing paths, a resource in a predetermined computing path may be preemptively or preferentially used for a very important scenario (e.g., a scenario associated with security, authentication, etc.). In the second type "Tbst" of computing paths, a resource in a predetermined computing path may be used, or may be replaced with another resource having a relatively low preference when the resource in the predetermined computing path is already in use or busy. In the third type "Lmt" of computing paths, a resource in a local device may only be used, or a resource in a local device and a companion device (or chip) may only be used. According to exemplary embodiments of the inventive concept, the third type "Lmt" of computing paths may be omitted.

According to exemplary embodiments of the inventive concept, as illustrated in FIG. 5, each initial computing path may include a path ID P_ID, a priority PRIO, the operation ID OP_ID, and the class ID CLS_ID. Each initial computing path may further include the level ID LV_ID and a range ID RNG_ID.

The path ID P_ID in each initial computing path may represent a type of an event or a type of a path corresponding to an event. For example, a term "Priv_spch" in FIG. 5 may represent a private speech event. A term "ADAS" in FIG. 5 may represent an advanced driver assistance system event. A term "Img_cls" in FIG. 5 may represent an image classify event. A term "Pub_spch" in FIG. 5 may represent a public speech event. A term "Auth" in FIG. 5 may represent a user authentication event.

The priority PRIO in each initial computing path may represent a priority for each event. For example, the priority PRIO in FIG. 5 may be a natural number greater than or equal to one, and a higher number may have a higher priority.

The operation ID OP_ID, the class ID CLS_ID, and the level ID LV_ID in FIG. 5 may be substantially the same as the operation ID OP_ID, the class ID CLS_ID, and the level ID LV_ID in FIG. 4, respectively. Furthermore, a term "Pool_max" in FIG. 5 may represent a calculation for pooling (e.g., sampling or resizing) maximum values among statistics of a specific feature. A term "FC" in FIG. 5 may represent a fully connected network. A term "Pool_mean" in FIG. 5 may represent a calculation for pooling mean values among statistics of a specific feature. A term "Conv_5×5" in FIG. 5 may represent a convolution operation of a 5*5 matrix. A term "Softmax" in FIG. 5 may represent a calculation for converting score values corresponding to predicted results into probability values.

The range ID RNG_ID in each initial computing path may represent a possible range or coverage for each event. For example, a term "Rmt" in FIG. 5 may represent that an event can be performed in a remote device. A term "Compan" in FIG. 5 may represent that an event can be performed in a companion device (or chip). A term "Lcl" in FIG. 5 may represent that an event can be performed in a local device.

As described above with reference to FIGS. 4 and 5, the preference level metrics and the plurality of initial computing paths may be implemented as hierarchical tables, may be predetermined or preset, and may be pre-stored in a storage. In an initial time for performing the method of managing the plurality of computing paths in the ANN according to an exemplary embodiment of the inventive concept, the preference level metrics and the plurality of initial computing paths may be loaded from the storage.

Figure 6:
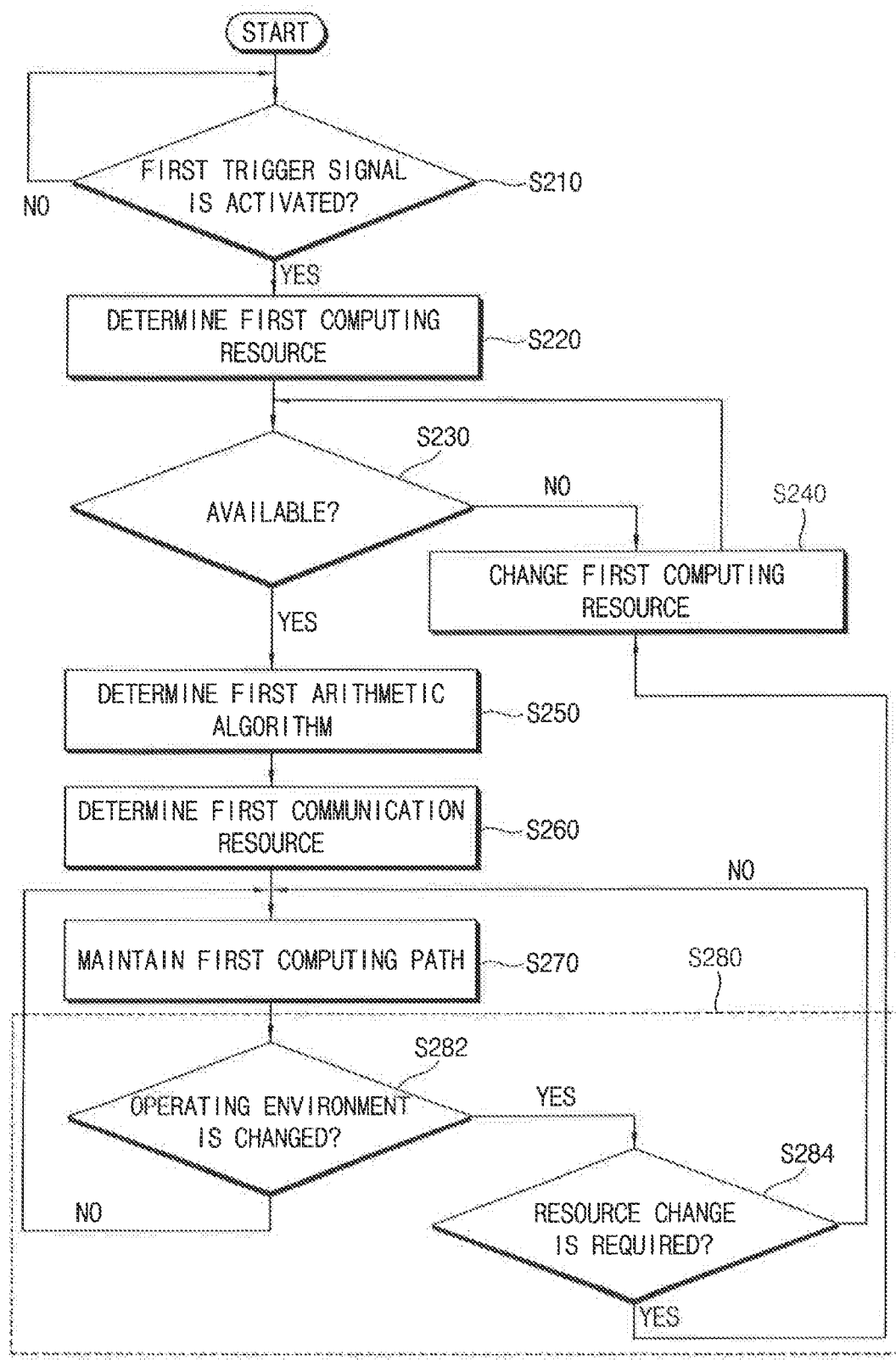
FIGS. 6 and 7 are flowcharts illustrating examples of setting a first computing path for a first event of FIG. 1 according to exemplary embodiments of the inventive concept.
Figure 7:
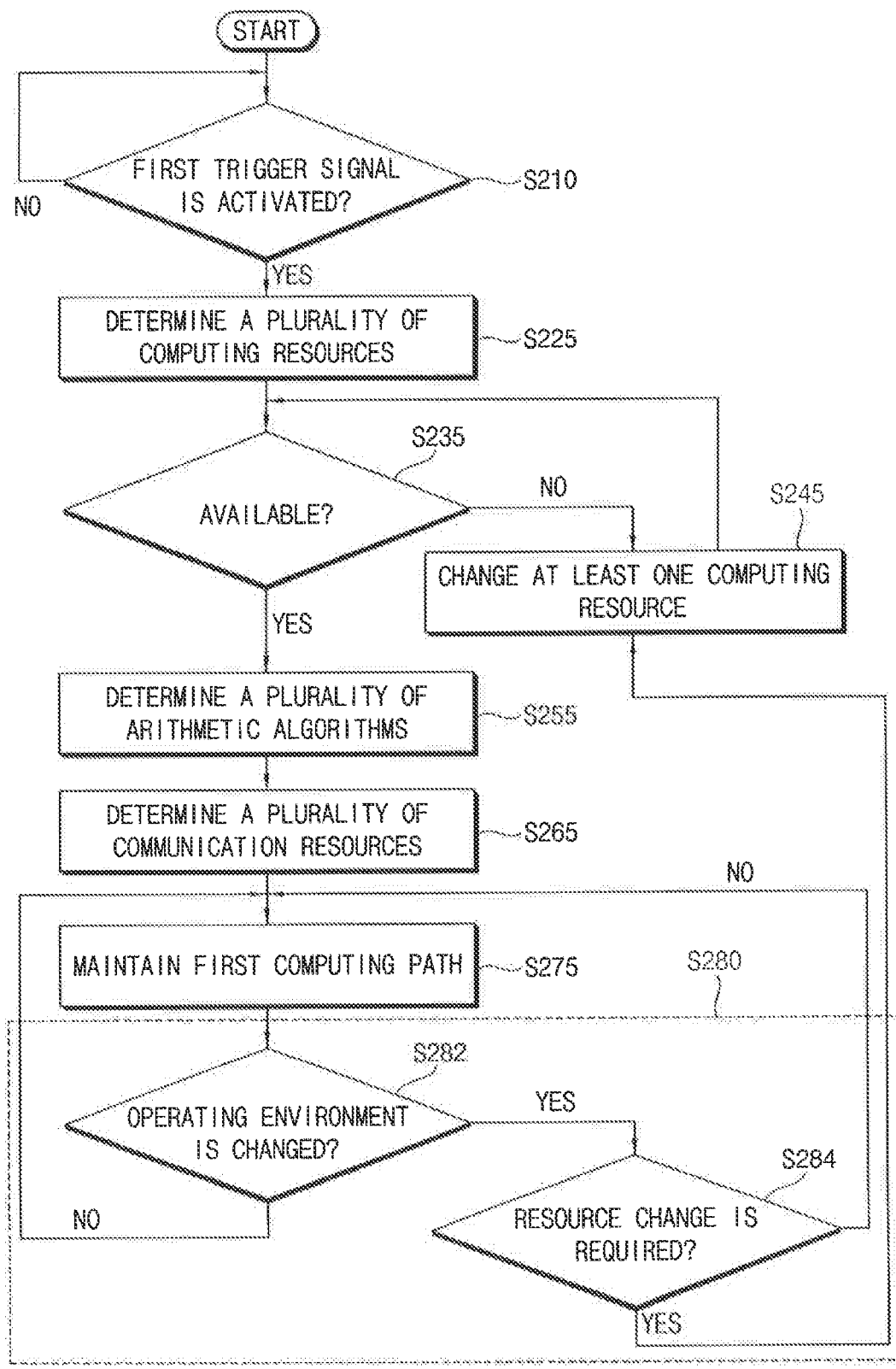

FIGS. 6 and 7 are flowcharts illustrating examples of setting a first computing path for a first event of FIG. 1 according to exemplary embodiments of the inventive concept. FIG. 6 illustrates an example where the first event includes one of the plurality of operations. FIG. 7 illustrates an example where the first event includes two or more of the plurality of operations.

Referring to FIGS. 1 and 6, in operation S200 of FIG. 1, it may be checked whether a first trigger signal is activated or not (operation S210). For example, the first trigger signal may be activated when the first event is to be performed by or on the ANN.

When the first trigger signal is not activated (operation S210: NO), it may be on standby for an activation of the first trigger signal. When the first trigger signal is activated (operation S210: YES), a first computing resource for the first event may be determined (operation S220). For example, the first computing resource may be determined based on at least one of a type of a first operation included in the first event and a type of data processed (e.g., input or output) by the first operation.

According to exemplary embodiments of the inventive concept, a first resource may be selected as the first computing resource. The first resource may be an available computing resource among the plurality of computing resources (e.g., the computing resources 120, 130, 140, 150, 160, 220, 230, 240, 250, and 260 in FIG. 2). When the first computing resource is unavailable, e.g., when the first resource becomes unavailable (operation S230: NO), the first computing resource may be changed (operation S240). For example, the first computing resource may be changed from the first resource to a second resource that is different from the first resource and is available among the plurality of computing resources. When the first computing resource is available (operation S230: YES), operations subsequent to operation S230 may be performed.

According to exemplary embodiments of the inventive concept, operations S230 and S240 may be repeated until an available computing resource is selected as the first computing resource. According to an exemplary embodiment of the inventive concept, operations S230 and S240 may be omitted.

After the first computing resource is determined, a first arithmetic algorithm for performing the first operation in the first computing resource may be determined (operation S250), and a first communication resource for the first event may be determined based on the type of data processed by the first operation (operation S260). For example, one of the plurality of arithmetic algorithms and one of the plurality of implementations capable of being performed in the first computing resource may be selected as the first arithmetic algorithm. An available communication resource among the plurality of communication resources (e.g., the computing resources 180, 190, 280, and 290 in FIG. 2) may be selected as the first communication resource.

The first computing path may be defined by the first computing resource, the first arithmetic algorithm, and the first communication resource, and may be maintained (operation S270). The first computing path may be used for performing the first event in operation S300 of FIG. 1.

According to exemplary embodiments of the inventive concept, when the operating environment is changed after the first computing path is set, the first computing resource may be selectively changed (operation S280). For example, when the operating environment is changed (operation S282: YES), and when a change of the first computing resource is required (operation S284: YES), the first computing resource may be changed (operation S240). When the operating environment is not changed and is maintained (operation S282: NO), the first computing resource as well as the first computing path may not be changed and may be maintained (operation S270). In addition, when the operating environment is changed (operation S282: YES), and when the change of the first computing resource is not required (operation S284: NO), the first computing resource as well as the first computing path may not be changed and may be maintained (operation S270). According to an exemplary embodiment of the inventive concept, operation S280 may be omitted.

According to exemplary embodiments of the inventive concept, the first computing path may be set based on the plurality of initial computing paths (e.g., the table of FIG. 5), the preference level metrics (e.g., the table of FIG. 4), the resource environment, and the operating environment. In other words, operations S220, S230, S240, S250, S260, S270, and S280 may be performed based on at least one of the plurality of initial computing paths, the preference level metrics, the resource environment, and the operating environment.

The resource environment may represent whether the plurality of heterogeneous resources is available or not. The resource environment may be obtained by the preference level metrics and the resource information described with reference to FIG. 1. For example, the types of the resources and the number of the resources may include, e.g., 8 CPUs, 256 GPU cores, 1024 PEs, 2 remote CPUs, a remote high-performance computing (HPC) system, etc. The performance/power information of each resource may include, e.g., FLOPs/s, "X" OPs/s, GFLOPs/W, throughput, etc. The data movement cost of each resource may include, e.g., data round-trip latency, etc. The limitations of each resource may include, e.g., the number of threads per GPU, unsupported data types, data layout and compression, etc.

The operating environment may represent contexts (e.g., current states or conditions) of the ANN and at least one electronic device including the plurality of heterogeneous resources. The operating environment may be obtained by the plurality of initial computing paths or various information. For example, the operating environment may include, e.g., types of parallelism (e.g., data or model), a preference of pre/post processing, locations of resources (e.g., local (on chip), companion (off-chip or system on chip (SoC)) or remote devices, specifications and requirements of the ANN (e.g., latency or power), information related to local and remote devices, etc. For example, the specifications and requirements of the ANN may include, e.g., layer topology (e.g., depth or branch), network compression scheme (e.g., pruning), types of arithmetic operation for each layer (e.g., cony, pooling, or relu), data properties (e.g., format, security, size, types of input sources/channels, physical or virtual location), memory layout for operands of input, kernel/filter, and output (e.g., padding, stride, or data dimension properties), data compression scheme (e.g., quantization, Lempel Ziv (LZ), or Huffman), etc. For example, the information related to the local and remote devices may include, e.g., changes of computing resource state, power and thermal-aware information, memory/storage status, application ID, lifecycle of applications, processes, threads, windows, activities, etc.

Referring to FIGS. 1 and 7, the example of FIG. 7 may be substantially the same as the example of FIG. 6, except that the first event includes two or more operations in the example of FIG. 7.

In operation S200 of FIG. 1, it may be checked whether the first trigger signal is activated or not (operation S210). When the first trigger signal is activated (operation S210: YES), a plurality of computing resources for the first event may be determined (operation S225). For example, a first computing resource may be determined based on at least one of a type of a first operation included in the first event and a type of first data processed by the first operation, and a second computing resource may be determined based on at least one of a type of a second operation included in the first event and a type of second data processed by the second operation. According to an exemplary embodiment of the inventive concept, the second computing resource may be substantially the same as or different from the first computing resource.

When at least one of the plurality of computing resources for the first event is unavailable (operation S235: NO), an unavailable computing resource may be changed (operation S245). When all of the plurality of computing resources for the first event are available (operation S235: YES), a plurality of arithmetic algorithms for the plurality of computing resources for the first event may be determined (operation S255), and a plurality of communication resources for the first event may be determined (operation S265). For example, a first arithmetic algorithm for performing the first operation in the first computing resource and a first communication resource for the first event may be determined, and a second arithmetic algorithm for performing the second operation in the second computing resource and a second communication resource for the first event may be determined. The first computing path may be defined by operations S225, S235, S245, S255, and S265, and may be maintained (operation S275). Operations S225, S235, S245, S255, S265, and S275 in FIG. 7 may be similar to operations S220, S230, S240, S250, S260, and S270 in FIG. 6, respectively.

When the operating environment is changed after the first computing path is set, at least one of the plurality of computing resources for the first event may be selectively changed (operation S280). Operations S280, S282, and S284 in FIG. 7 may be substantially the same as operations S280, S282, and S284 in FIG. 6, respectively.

According to an exemplary embodiment of the inventive concept, in operation S300 of FIG. 1, the first event may be repeatedly performed (e.g., in a loop) until the first trigger signal is deactivated, or may be performed once based on the activated first trigger signal.

Figure 8A:
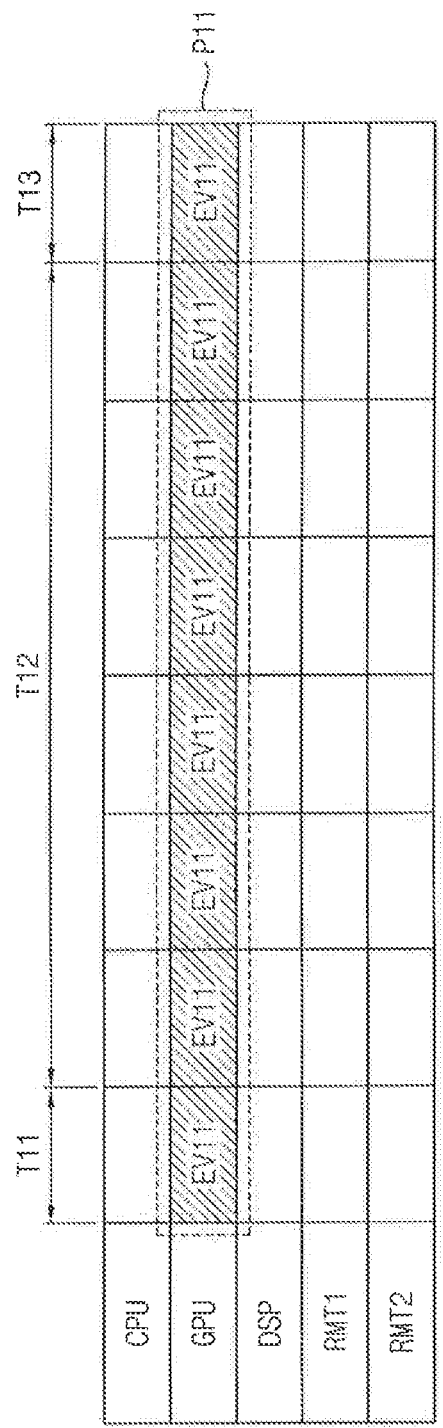
FIGS. 8A, 8B and 8C are diagrams for describing a method of managing a plurality of computing paths in an ANN according to an exemplary embodiment of the inventive concept.
Figure 8B:
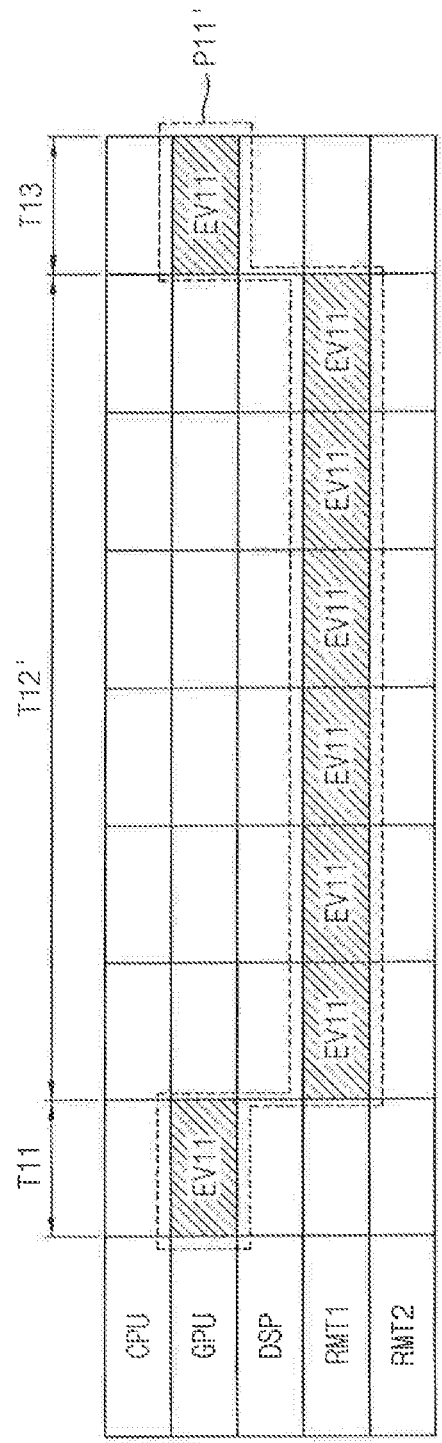
Figure 8C:
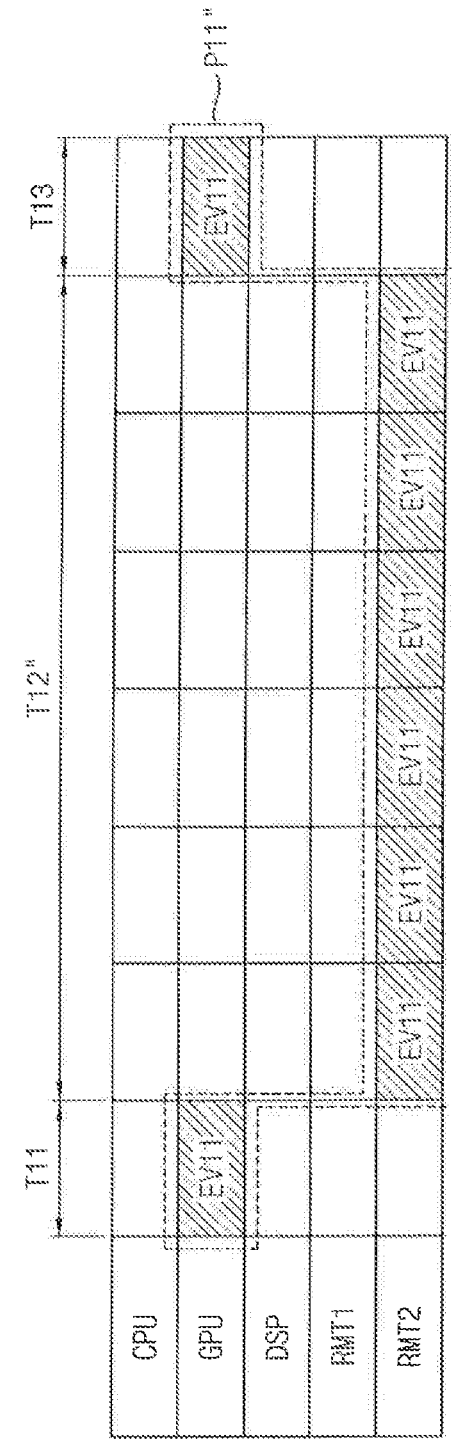

FIGS. 8A, 8B, and 8C are diagrams for describing a method of managing a plurality of computing paths in an ANN according to an exemplary embodiment of the inventive concept. In FIGS. 8A, 8B, and 8C, "CPU", "GPU", and "DSP" represent a central processing unit, a graphic processing unit, and a digital signal processor, respectively, in a local device, and "RMT1" and "RMT2" represent a first remote device and a second remote device, respectively, which are interoperable with the local device.

Referring to FIG. 8A, in an initial time, a first computing path P11 for a first event EV11 may be set. For example, the first computing path P11 may be set based on the plurality of initial computing paths such that the first event EV11 is performed by the graphic processing unit GPU in the local device during all of time intervals T11, T12, and T13. For example, the first event EV11 may be a voice assistant application based on a long short term memory (LSTM) architecture, and the local device may be a smart watch. In the example of FIG. 8A, the first computing path P11 may be the second type "Tbst" of computing paths, as described with reference to FIG. 5. The first event EV11 may be performed in a loop.

Referring to FIG. 8B, the operating environment may be changed, and then the first computing path P11 for the first event EV11 may be changed to a computing path P11' based on the change of the operating environment. For example, the local device may enter a low power mode, and then the changed computing path P11' may be set for the first event EV11 based on the change of the operating environment such that the first event EV11 is performed by the graphic processing unit in the local device during the time intervals T11 and T13 and by the first remote device RMT1 during a time interval T12'. For example, the first remote device RMT1 may be a home IoT server.

Referring to FIG. 8C, the operating environment may be further changed, and then the computing path P11' for the first event EV11 may be changed to a computing path P11" based on the further change of the operating environment. For example, the local device may enter a private mode by a user, and then the changed computing path P11" may be set for the first event EV11 based on the further change of the operating environment such that the first event EV11 is performed by the graphic processing unit GPU in the local device during the time intervals T11 and T13 and by the second remote device RMT2 during a time interval T12". For example, the second remote device RMT2 may be a personal portable device such as a smart phone.

According to an exemplary embodiment of the inventive concept, each of the time intervals T12' in FIG. 8B and T12" in FIG. 8C may be substantially the same as or different from the time interval T12 in FIG. 8A.

Figure 9:
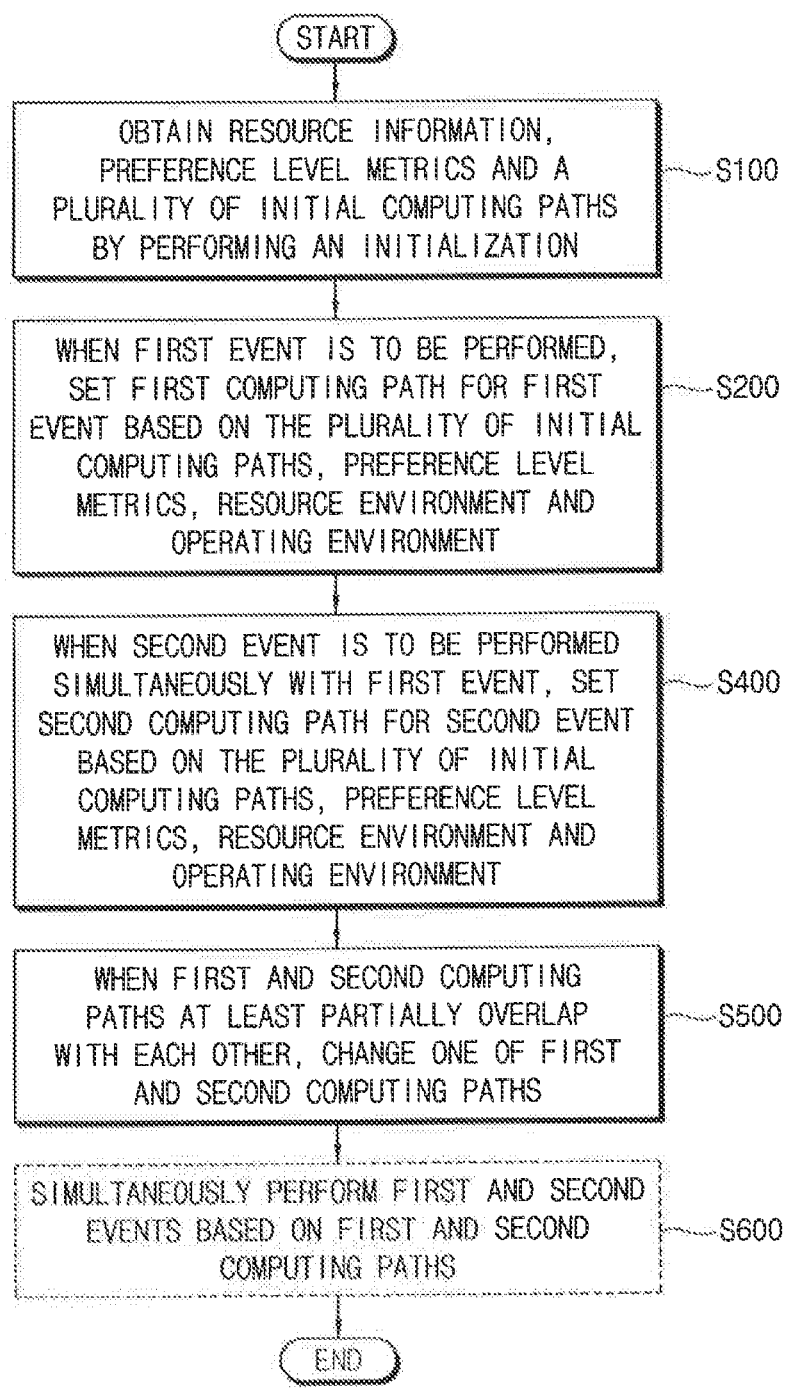
FIG. 9 is a flowchart illustrating a method of managing a plurality of computing paths in an ANN according to an exemplary embodiment of the inventive concept.

FIG. 9 is a flowchart illustrating a method of managing a plurality of computing paths in an ANN according to an exemplary embodiment of the inventive concept.

Referring to FIG. 9, in a method of managing a plurality of computing paths in an ANN according to an exemplary embodiment of the inventive concept, the ANN is implemented or driven by the plurality of heterogeneous resources. In this method, resource information, preference level metrics, and the plurality of initial computing paths are obtained by performing an initialization (operation S100). When the first event is to be performed, the first computing path for the first event is set based on the plurality of initial computing paths, the preference level metrics, resource environment, and operating environment (operation S200). Operations S100 and S200 in FIG. 9 may be substantially the same as operations S100 and S200 in FIG. 1, respectively.

When a second event is to be performed substantially simultaneously with the first event, a second computing path for the second event may be set based on the plurality of initial computing paths, the preference level metrics, the resource environment, and the operating environment (operation S400). The second event may be different from the first event, and may include at least one of a plurality of operations (e.g., arithmetic operations or computing operations). Operation S400 may be similar to operation S200, and will be described below with reference to FIG. 10.

When the first and second computing paths at least partially overlap with each other, one of the first and second computing paths may be changed (operation S500). Operation S500 will be described below with reference to FIG. 11.

The first and second events may be substantially simultaneously or concurrently performed based on the first and second computing paths, respectively (operation S600).

According to exemplary embodiments of the inventive concept, operation S600 in FIG. 9 may be omitted. In other words, the method of managing the plurality of computing paths in the ANN according to an exemplary embodiment of the inventive concept may include only operations S100, S200, S400, and S500.

According to exemplary embodiments of the inventive concept, operations S100, S200, S400, S500, and S600 together may be referred to as a method of processing or performing a plurality of operations in an ANN.

In the method of managing the plurality of computing paths in the ANN according to an exemplary embodiment of the inventive concept, the first and second computing paths may be set based on the plurality of initial computing paths, the preference level metrics, the resource environment, and the operating environment, one of the first and second computing paths may be changed when the first and second computing paths at least partially overlap with each other, and the first and second events may be performed based on the first and second computing paths. In other words, a plurality of events or operations may be performed using optimized computing paths that are dynamically and adaptively set based on resources and context. Accordingly, the ANN performing a plurality of services may have relatively increased performance and energy efficiency.

Figure 10:
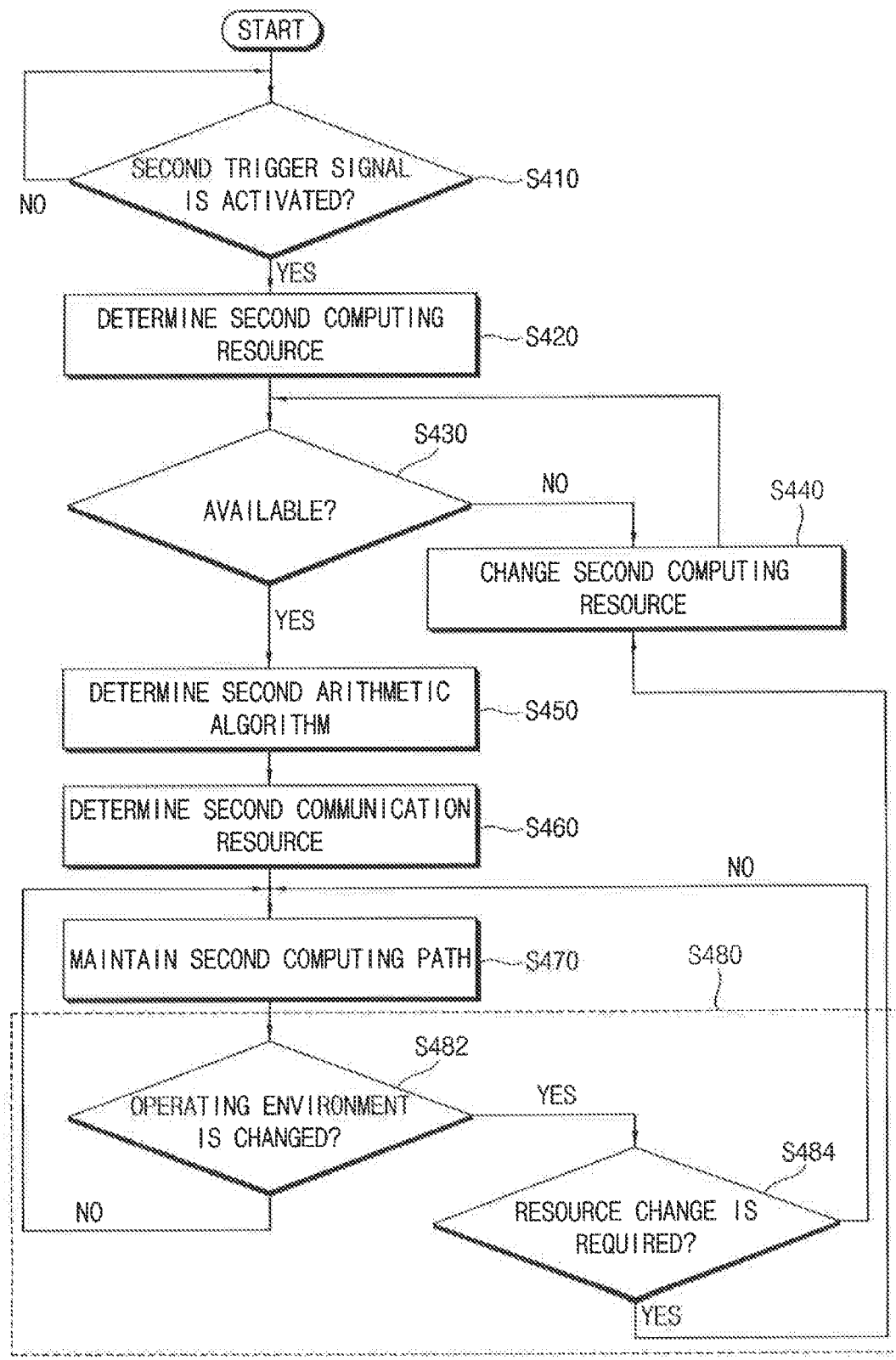
FIG. 10 is a flowchart illustrating an example of setting a second computing path for a second event of FIG. 9 according to an exemplary embodiment of the inventive concept.

FIG. 10 is a flowchart illustrating an example of setting a second computing path for a second event of FIG. 9. FIG. 10 illustrates an example where the second event includes one of the plurality of operations.

Referring to FIGS. 9 and 10, an example of FIG. 10 may be similar to the example of FIG. 6. In operation S400 of FIG. 9, it may be checked whether a second trigger signal is activated or not (operation S410). For example, the second trigger signal may be activated when the second event is to be performed by or on the ANN.

When the second trigger signal is not activated (operation S410: NO), it may be on standby for an activation of the second trigger signal. When the second trigger signal is activated (operation S410: YES), a second computing resource for the second event may be determined (operation S420). For example, the second computing resource may be determined based on at least one of a type of a second operation included in the second event and a type of data processed by the second operation.

When the second computing resource is unavailable (operation S430: NO), the second computing resource may be changed (operation S440). When the second computing resource is available (operation S430: YES), a second arithmetic algorithm for performing the second operation in the second computing resource may be determined (operation S450), and a second communication resource for the second event may be determined (operation S460). The second computing path may be defined by the second computing resource, the second arithmetic algorithm, and the second communication resource, and may be maintained (operation S470).

According to exemplary embodiments of the inventive concept, when the operating environment is changed after the second computing path is set, the second computing resource may be selectively changed (operation S480). For example, when the operating environment is changed (operation S482: YES), and when a change of the second computing resource is required (operation S484: YES), the second computing resource may be changed (operation S440). When the operating environment is not changed and is maintained (operation S482: NO), the second computing resource as well as the second computing path may not be changed and may be maintained (operation S470). In addition, when the operating environment is changed (operation S482: YES), and when the change of the second computing resource is not required (operation S484: NO), the second computing resource as well as the second computing path may not be changed and may be maintained (operation S470). According to an exemplary embodiment of the inventive concept, operation S480 may be omitted.

Operations S410, S420, S430, S440, S450, S460, S470, S480, S482, and S484 in FIG. 10 may be similar to operations S210, S220, S230, S240, S250, S260, S270, S280, S282, and S284 in FIG. 6, respectively.

According to an exemplary embodiment of the inventive concept, the second event may include two or more of the plurality of operations. In an example where the second event includes two or more operations, operation S400 of FIG. 9 may be implemented similar to the example of FIG. 7.

Figure 11:
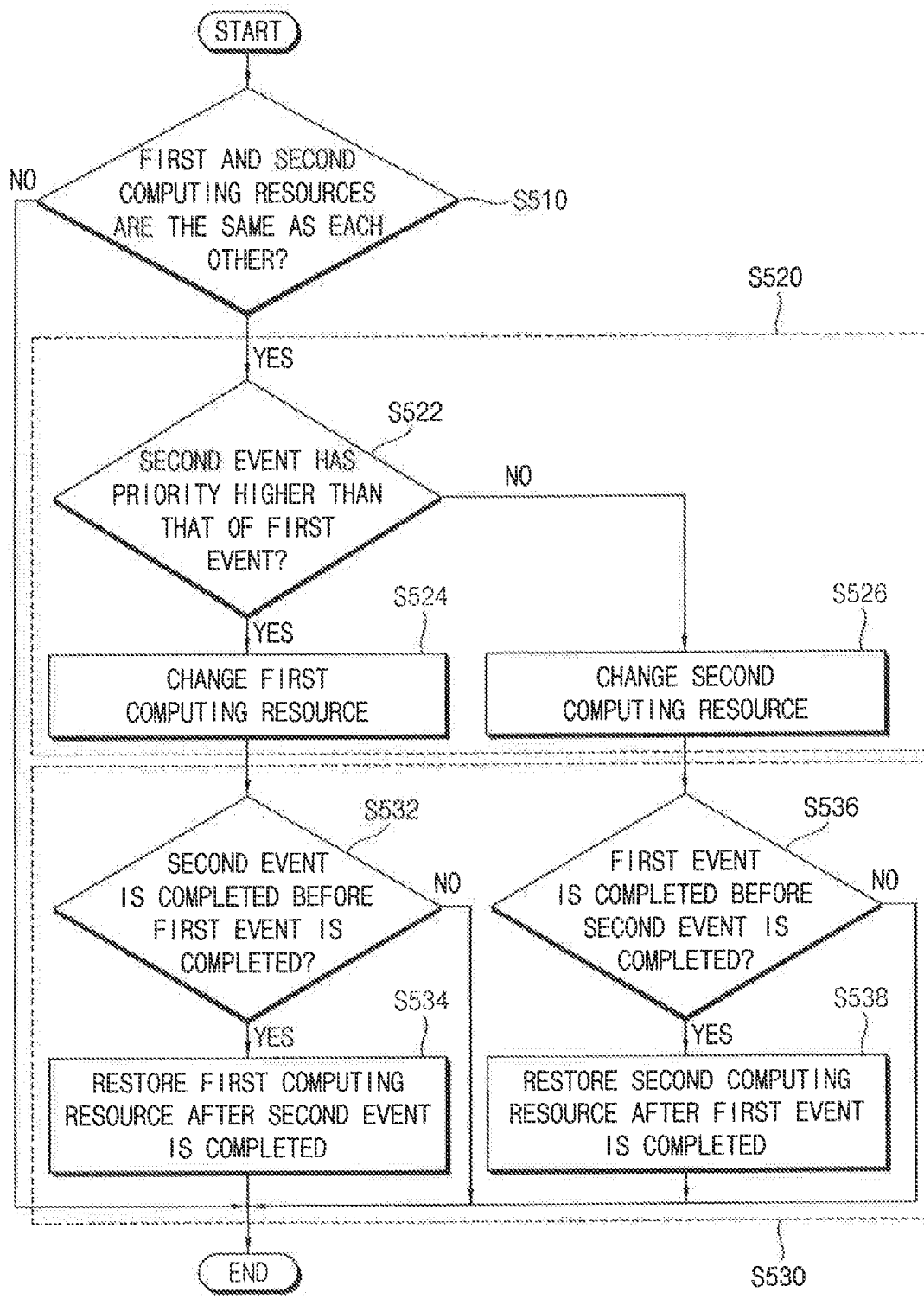
FIG. 11 is a flowchart illustrating an example of changing one of first and second computing paths of FIG. 9 according to an exemplary embodiment of the inventive concept.

FIG. 11 is a flowchart illustrating an example of changing one of first and second computing paths of FIG. 9 according to an exemplary embodiment of the inventive concept.

Referring to FIGS. 9 and 11, in operation S500 of FIG. 9, it may be checked whether the first computing resource included in the first computing path is substantially the same as the second computing resource included in the second computing path (operation S510).

When the first and second computing resources are substantially the same as each other, e.g., when a first resource among the plurality of heterogeneous resources is selected as both the first and second computing resources (operation S510: YES), one of the first and second computing resources may be changed based on priorities of the first and second events (operation S520). For example, a computing resource that corresponds to an event having a relatively low priority may be changed.

In operation S520, when the second event has a priority higher than that of the first event (operation S522: YES), the first computing resource corresponding to the first event may be changed (operation S524). For example, the first computing resource may be changed from the first resource to a second resource different from the first resource. When the first event has a priority higher than that of the second event (operation S522: NO), the second computing resource corresponding to the second event may be changed (operation S526).

After one of the first and second computing resources is changed, the changed computing resource may be selectively restored (operation S530). For example, for two events sharing the same computing resource, one of the two events having a lower priority may have its computing resource changed (e.g., operations S510 and S520 described above). When the event having a relatively high priority is completed before the event having a relatively low priority is completed, the computing resource that corresponds to the event having the relatively low priority may be restored to an original resource.

In operation S530, after the first computing resource that corresponds to the first event having a relatively low priority is changed (e.g., after operation S524), if the second event having a relatively high priority is completed before the first event is completed (operation S532: YES), the first computing resource may be restored after the second event is completed (operation S534). For example, when the second event is completed at a first time point and the first event is completed at a second time point later than the first time point, the first computing resource may be restored from the second resource to the first resource after the first time point. Alternatively, after the first computing resource is changed (e.g., after operation S524), if the first event is completed before the second event is completed (operation S532: NO), the first computing resource may not be restored.

Similarly, in operation S530, after the second computing resource that corresponds to the second event having a relatively low priority is changed (e.g., after operation S526), if the first event having a relatively high priority is completed before the second event is completed (operation S536: YES), the second computing resource may be restored after the first event is completed (operation S538). For example, when the first event is completed at a third time point and the second event is completed at a fourth time point later than the third time point, the second computing resource may be restored from the second resource to the first resource after the third time point. Alternatively, after the second computing resource is changed (e.g., after operation S526), if the second event is completed before the first event is completed (operation S536: NO), the second computing resource may not be restored.

When the first and second computing resources are different from each other (operation S510: NO), the first and second computing resources may not be changed.

Although the method of managing (e.g., changing) computing paths are described with reference to FIG. 11 based on an example where each of two computing paths includes a single operation and a single computing resource, the inventive concept is not limited thereto. The method of managing (e.g., changing) computing paths according to an exemplary embodiment of the inventive concept may be applied to or employed in an example where each of the two computing paths includes a plurality of operations and a plurality of computing resources and at least a part of the plurality of computing resources is used during the same time interval. The method may also be applied to or employed in an example including more than three computing paths.

FIGS. 12A, 12B, 12C, 13A, 13B, and 13C are diagrams for describing a method of managing a plurality of computing paths in an ANN according to exemplary embodiments of the inventive concept. In FIGS. 12A, 12B, 12C, 13A, 13B, and 13C, "CPU", "GPU", "DSP", and "DHW" represent a central processing unit, a graphic processing unit, a digital signal processor, and a dedicated hardware in a local device, respectively, and "RMT" represents a remote device that is interoperable with the local device.

Figure 12A:
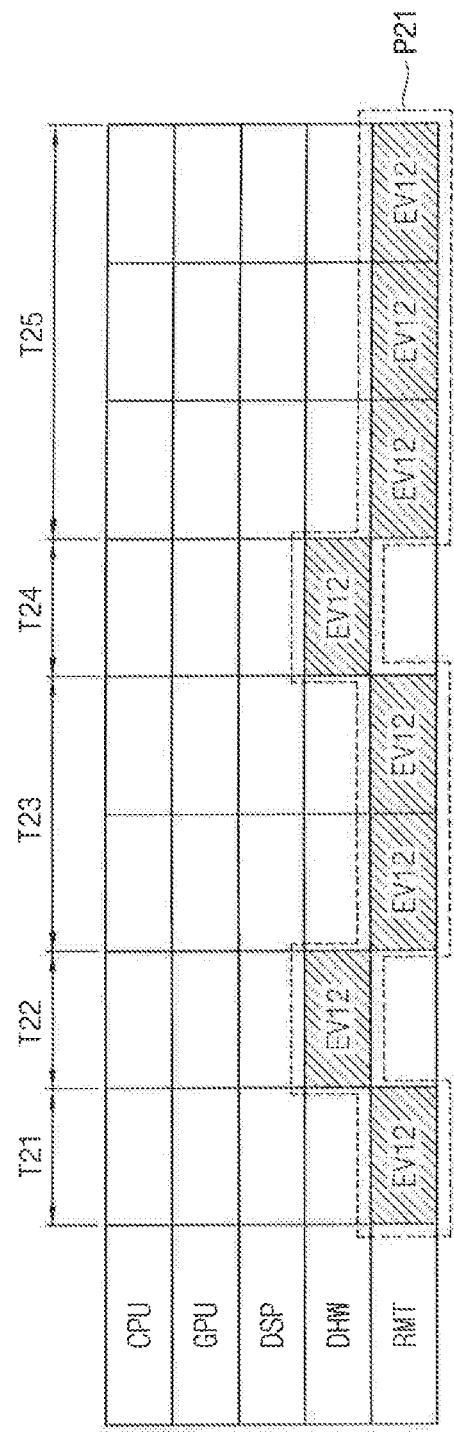

Referring to FIG. 12A, in an initial time, a first computing path P21 for a first event EV12 may be set. For example, the first computing path P21 may be set based on the plurality of initial computing paths such that the first event EV12 is performed by the remote device RMT during time intervals T21, T23, and T25 and by the dedicated hardware DHW in the local device during time intervals T22 and T24. For example, the first event EV12 may be an advanced driver assistance system application based on a convolutional neural network (CNN) architecture, the local device may be a smart phone, and the remote device may be a neural processing unit or device. In the example of FIG. 12A, the first computing path P21 may be the first type "Preem" of computing paths as described with reference to FIG. 5. The first event EV12 may be performed in a loop.

Figure 12B:
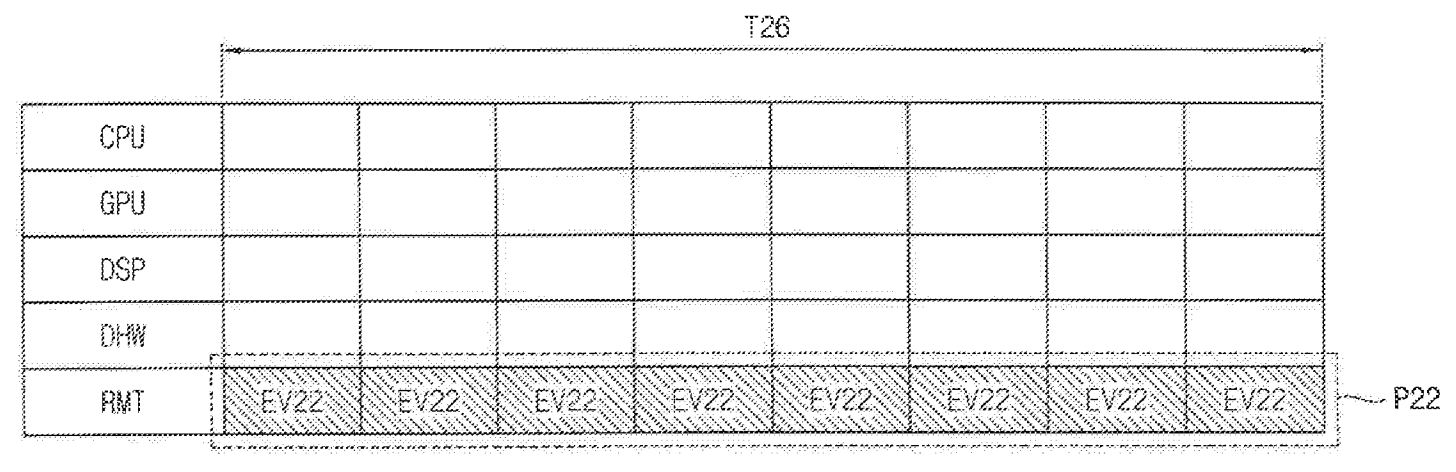

Referring to FIG. 12B, in the initial time, a second computing path P22 for a second event EV22 may be set. For example, the second computing path P22 may be set based on the plurality of initial computing paths such that the second event EV22 is performed by the remote device RMT during a time interval T26. For example, the second event EV22 may be a multi-modal authentication application including fingerprint and iris recognition (or identification). In the example of FIG. 12B, the second computing path P22 may be the first type "Preem" of computing paths as described with reference to FIG. 5. The second event EV22 may have a priority higher than that of the first event EV12.

Figure 12C:
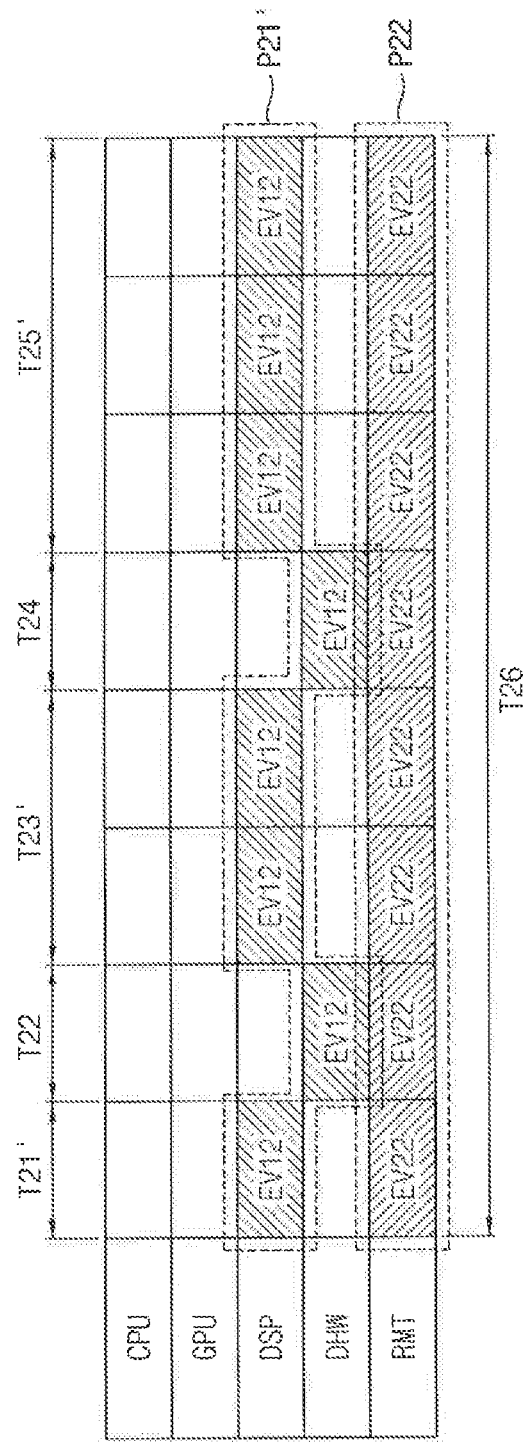

Referring to FIG. 12C, while the first event EV12 is repeatedly performed, the second event EV22 may also be performed. In other words, the first and second events EV12 and EV22 may be substantially simultaneously or concurrently performed. Since the priority of the first event EV12 is lower than the priority of the second event EV22, the first computing path P21 for the first event EV12 may be changed to a computing path P21'. For example, the changed computing path P21' may be set for the first event EV12 based on the preference level metrics such that the first event EV12 is performed by the digital signal processor DSP in the local device during time intervals T21', T23', and T25' and by the dedicated hardware DHW in the local device during the time intervals T22 and T24. The second computing path P22 may be maintained.

According to an exemplary embodiment of the inventive concept, each of the time intervals T21', T23', and T25' in FIG. 12C may be substantially the same as or different from the time intervals T21, T23, and T25 in FIG. 12A, respectively.

Figure 13A:
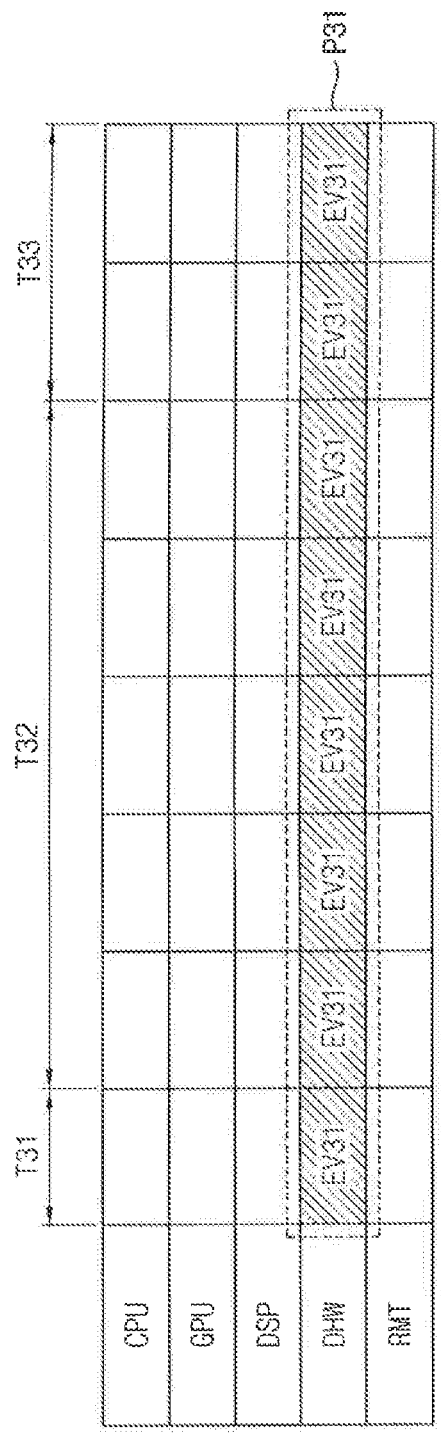

Referring to FIG. 13A, in an initial time, a first computing path P31 for a first event EV31 may be set. For example, the first computing path P31 may be set based on the plurality of initial computing paths such that the first event EV31 is performed by the dedicated hardware DHW in the local device during all of time intervals T31, T32, and T33. For example, the first event EV31 may be a gallery or photo application based on an AlexNet of a CNN architecture, and the local device may be a smart phone. In the example of FIG. 13A, the first computing path P31 may be the second type "Tbst" of computing paths as described with reference to FIG. 5. The first event EV31 may be performed in a loop.

Figure 13B:
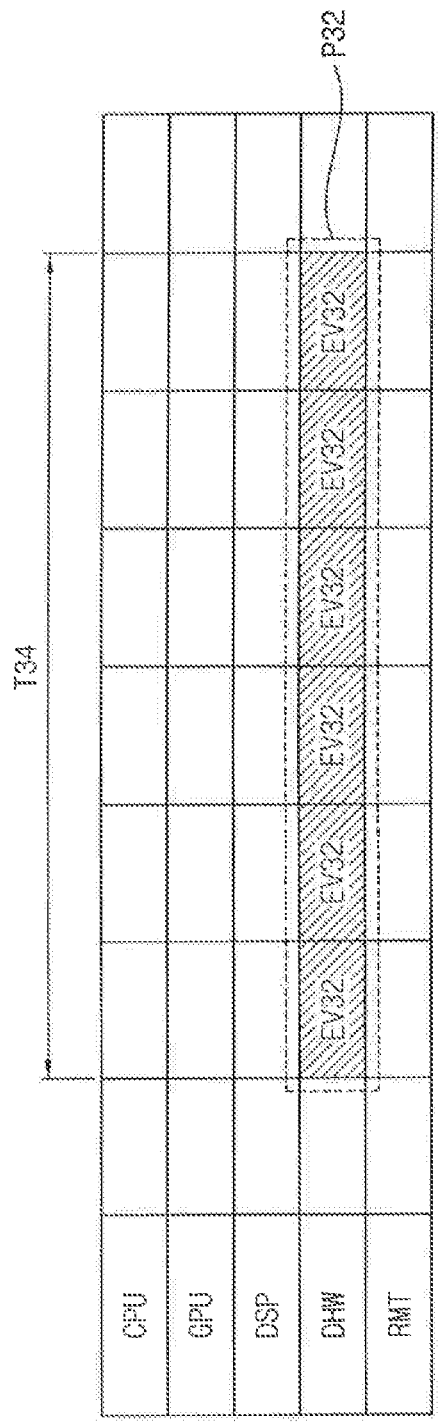

Referring to FIG. 13B, in the initial time, a second computing path P32 for a second event EV32 may be set. For example, the second computing path P32 may be set based on the plurality of initial computing paths such that the second event EV32 is performed by the dedicated hardware DHW in the local device during time interval T34. For example, the second event EV32 may be a fingerprint recognition application for unlocking a device. In the example of FIG. 13B, the second computing path P32 may be the first type "Preem" of computing paths as described with reference to FIG. 5. The second event EV32 may have a priority higher than that of the first event EV31.

Figure 13C:
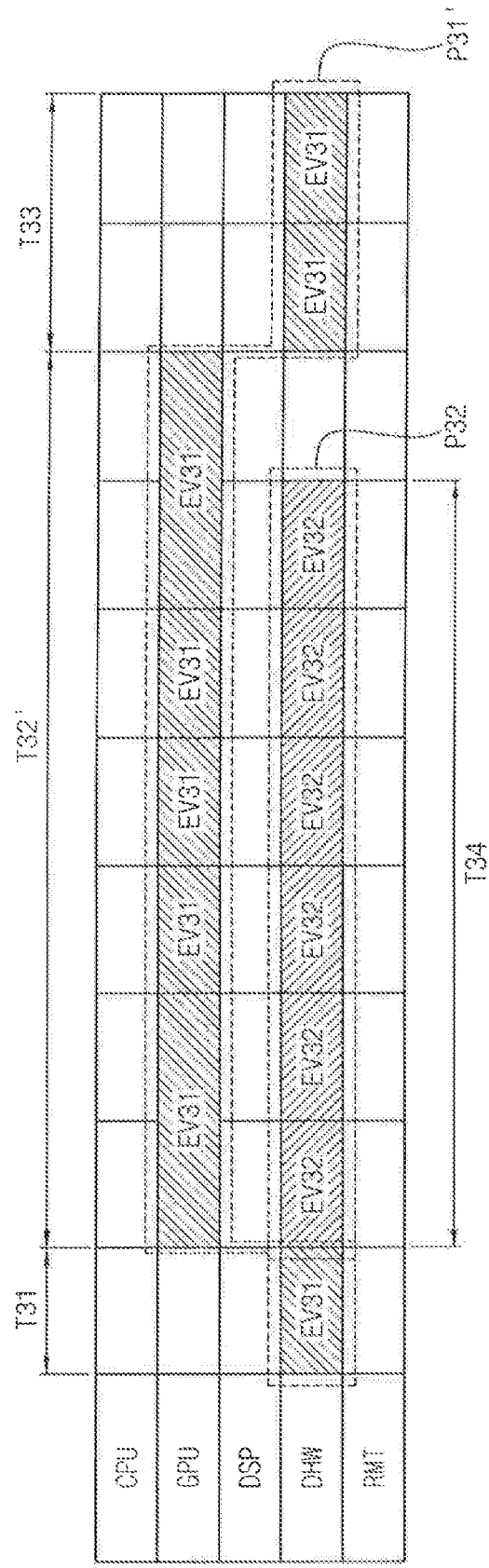

Referring to FIG. 13C, while the first event EV31 is repeatedly performed, the second event EV32 may also be performed. In other words, the first and second events EV31 and EV32 may be substantially simultaneously or concurrently performed. Since the priority of the first event EV31 is lower than the priority of the second event EV32, the first computing path P31 for the first event EV31 may be changed to a computing path P31'. For example, the changed computing path P31' may be set for the first event EV31 based on the preference level metrics such that the first event EV31 is performed by the graphic processing unit GPU in the local device during a time interval T32' and by the dedicated hardware DHW in the local device during the time intervals T31 and T33. The second computing path P32 may be maintained. In the example of FIG. 13C, since the second event EV32 having a higher priority is completed before the first event EV31 having a lower priority is completed, the first event EV31 may be performed by the dedicated hardware DHW in the local device during the time interval T33 after the second event EV32 is completed. In other words, the dedicated hardware DHW is restored for the first event EV31.

According to exemplary embodiments of the inventive concept, the time interval T32' may be longer than the time interval T32 because the first event EV31 is performed by the dedicated hardware DHW during the time interval T32 and by a general graphic processing unit (the graphic processing unit GPU) during the time interval T32'.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

The inventive concept may be applied to various devices and systems that include an ANN. For example, the inventive concept may be applied to systems such as a mobile phone, a smart phone, a tablet computer, a laptop computer, a PDA, a PMP, a digital camera, a portable game console, a wearable system, an IoT system, a VR system, an AR system, etc.

As described above, in the method and the system of managing the computing paths in the ANN according to exemplary embodiments of the inventive concept, an optimized computing path may be set based on the plurality of initial computing paths, the preference level metrics, the resource environment, and the operating environment, and an event and/or operation may be performed based on the optimized computing path. When some of optimized computing paths at least partially overlap with each other, at least one optimized computing path may be changed, and then events and/or operations may be performed based on the optimized and changed computing path. Accordingly, optimized computing paths may be dynamically and adaptively set in a resource-aware and context-aware manner, and the ANN may have relatively increased performance and energy efficiency.

While the inventive concept has been shown and described with reference to exemplary embodiments thereof, it will be apparent to those of ordinary skill in the art that various changes and modifications in form and details may be made thereto without departing from the spirit and scope of the inventive concept as set forth in the following claims.

What is claimed is:

1. A method of managing a plurality of computing paths in an artificial neural network (ANN) configured to be driven by a plurality of heterogeneous resources, the method comprising:

obtaining resource information, preference level metrics, and a plurality of initial computing paths by performing an initialization prior to a plurality of events, each initial computing path representing a priority for each event of the plurality of events, wherein the resource information represents information associated with the plurality of heterogeneous resources, the preference level metrics represent a relationship between the plurality of heterogeneous resources and a plurality of operations, and the plurality of initial computing paths represents computing paths predetermined for the plurality of operations; and setting a first computing path for a first event including at least one of the plurality of operations based on the plurality of initial computing paths, the preference level metrics, a resource environment, and an operating environment, when the first event is to be performed, wherein the resource environment represents whether the plurality of heterogeneous resources is available, and the operating environment represents contexts of the ANN and at least one electronic device including the plurality of heterogeneous resources.

2. The method of claim 1, wherein setting the first computing path for the first event comprises:
determining a first computing resource based on a type of a first operation included in the first event;
determining a first arithmetic algorithm for performing the first operation in the first computing resource; and
determining a first communication resource based on a type of data processed by the first operation.

3. The method of claim 2, wherein the first computing resource is further determined based on the type of the data processed by the first operation.

4. The method of claim 2, wherein determining the first computing resource comprises:
selecting a first resource that is available among the plurality of heterogeneous resources as the first computing resource.

5. The method of claim 4, wherein setting the first computing path for the first event further comprises:
changing the first computing resource when the first resource is unavailable.

6. The method of claim 2, wherein setting the first computing path for the first event further comprises:
changing the first computing resource when the operating environment is changed.

7. The method of claim 2, wherein setting the first computing path for the first event further comprises:
determining a second computing resource based on a type of a second operation included in the first event;
determining a second arithmetic algorithm for performing the second operation in the second computing resource; and
determining a second communication resource based on a type of data processed by the second operation.

8. The method of claim 2, further comprising:
setting a second computing path for a second event including at least one of the plurality of operations based on the plurality of initial computing paths, the preference level metrics, the resource environment, and the operating environment, when the second event is to be performed simultaneously with the first event.

9. The method of claim 8, wherein setting the second computing path for the second event comprises:
determining a second computing resource based on a type of a second operation included in the second event;
determining a second arithmetic algorithm for performing the second operation in the second computing resource; and
determining a second communication resource based on a type of data processed by the second operation.

10. The method of claim 9, further comprising:
changing one of the first and second computing paths when the first and second computing paths at least partially overlap with each other.

11. The method of claim 10, wherein changing one of the first and second computing paths comprises:
changing the first computing resource from a first resource to a second resource that is different from the first resource when the first resource is selected as both the first and second computing resources and the second event has a priority higher than that of the first event,
wherein the plurality of heterogeneous resources includes the first and second resources.

12. The method of claim 11, wherein when the second event is completed at a first time point and the first event is completed at a second time point later than the first time point, changing one of the first and second computing paths further comprises:
restoring the first computing resource from the second resource to the first resource after the first time point.

13. The method of claim 1, wherein the preference level metrics include an operation identification (ID), a class ID, a level ID, a resource ID, an arithmetic algorithm ID, and an implementation ID for each of the plurality of operations.

14. The method of claim 1, wherein the plurality of initial computing paths includes a first type of computing paths for preempting at least one of the plurality of heterogeneous resources, a second type of computing paths based on the resource environment and priorities of the plurality of heterogeneous resources, and a third type of computing paths for limiting some of the plurality of heterogeneous resources.

15. A system of managing a plurality of computing paths in an artificial neural network (ANN), the system comprising:
a plurality of heterogeneous resources configured to drive the ANN; and
at least one adaptive path manager configured to manage the plurality of computing paths in the ANN,
wherein the at least one adaptive path manager is configured to obtain resource information, preference level metrics, and a plurality of initial computing paths by performing an initialization prior to a plurality of events, each initial computing path representing a priority for each event of the plurality of events,
wherein the resource information represents information associated with the plurality of heterogeneous resources, the preference level metrics represent a relationship between the plurality of heterogeneous resources and a plurality of operations, and the plurality of initial computing paths represents computing paths predetermined for the plurality of operations,
wherein the at least one adaptive path manager is configured to set a first computing path for a first event including at least one of the plurality of operations based on the plurality of initial computing paths, the preference level metrics, a resource environment, and an operating environment, when the first event is to be performed, and
wherein the resource environment represents whether the plurality of heterogeneous resources is available, and the operating environment represents at least one electronic device including the plurality of heterogeneous resources and at least one of a layer topology of the ANN, a network compression scheme of the ANN, and types of arithmetic operations of the ANN.

16. A method of managing a plurality of computing paths in an artificial neural network (ANN) configured to be driven by a plurality of heterogeneous resources, the method comprising:
- obtaining resource information, preference level metrics, and a plurality of initial computing paths by performing an initialization prior to a plurality of events, each initial computing path representing a priority for each event of the plurality of events, wherein the resource information represents information associated with the plurality of heterogeneous resources, the preference level metrics represents a relationship between the plurality of heterogeneous resources and a plurality of operations, and the plurality of initial computing paths represents computing paths predetermined for the plurality of operations;
- determining that a first trigger signal for a first event to be performed by the ANN or on the ANN is activated and a second trigger signal for a second event to be performed by the ANN or on the ANN is activated, wherein each of the first and second events include at least one of the plurality of operations to be, and wherein each of the first and second events are based on an architecture of the ANN;
- setting a first computing path for the first event and a second computing path for the second event based on the plurality of initial computing paths, the preference level metrics, resource environment, and operating environment, wherein the resource environment represents whether the plurality of heterogeneous resources is available, and the operating environment represents contexts of the ANN and at least one electronic device including the plurality of heterogeneous resources; and
- changing one of the first and second computing paths when the first and second computing paths at least partially overlap with each other.

17. The method of claim 16, wherein setting the first computing path for the first event comprises:
- determining a first computing resource based on a type of a first operation included in the first event;
- determining a first arithmetic algorithm for performing the first operation in the first computing resource; and
- determining a first communication resource based on a type of data processed by the first operation.

18. The method of claim 17, further comprising:
- determining whether the operating environment is changed;
- determining whether a change is required for the first computing resource; and
- changing the first computing resource when it is determined that the operating environment is changed and that the change is required for the first computing resource.

19. The method of claim 16, wherein changing one of the first and second computing paths comprises:
- determining that a first computing resource for the first event and a second computing resource for the second event are the same as each other;
- determining that the second event has a higher priority than the first event;
- changing the first computing resource from a first resource to a second resource that is different from the first resource;
- determining that the second event is completed before the first event is completed; and
- restoring the first computing resource to the first resource.

20. The method of claim 16, wherein the first event is performed in a loop until the first trigger signal is deactivated.

* * * * *